United States Patent [19]

Kurakake et al.

[11] Patent Number: 4,852,024
[45] Date of Patent: Jul. 25, 1989

[54] PICTURE PROCESSING APPARATUS

[75] Inventors: Mitsuo Kurakake; Shoichi Otsuka, both of Hino, Japan

[73] Assignee: Fanuc Ltd., Minamitsuru, Japan

[21] Appl. No.: 52,049

[22] PCT Filed: Aug. 19, 1986

[86] PCT No.: PCT/JP86/00424
§ 371 Date: Apr. 10, 1987
§ 102(e) Date: Apr. 10, 1987

[87] PCT Pub. No.: WO87/01223
PCT Pub. Date: Feb. 26, 1987

[30] Foreign Application Priority Data

Aug. 19, 1985 [JP] Japan .................................. 60-181567

[51] Int. Cl.[4] .............................................. G06F 15/66
[52] U.S. Cl. .................................... 364/521; 364/518; 340/721; 340/723; 340/747; 382/48; 382/56
[58] Field of Search ........................ 364/518, 521, 414; 340/721, 723, 747; 358/101, 106, 107, 111; 382/8, 16, 48, 56, 45, 46

[56] References Cited

U.S. PATENT DOCUMENTS

| 4,400,728 | 8/1983 | Long .................................. 358/107 |
| 4,450,579 | 5/1984 | Nakashima et al. .................. 382/8 |
| 4,479,145 | 10/1984 | Azuma et al. ...................... 358/106 |
| 4,589,139 | 5/1986 | Hada et al. ........................... 382/8 |
| 4,651,341 | 3/1987 | Nakashima et al. ................. 382/34 |
| 4,700,224 | 10/1987 | Miyasaka et al. .................. 358/101 |
| 4,707,647 | 11/1987 | Coldren et al. ..................... 318/568 |

FOREIGN PATENT DOCUMENTS

| 124946 | 10/1978 | Japan . |
| 19191 | 1/1985 | Japan . |
| 81686 | 5/1985 | Japan . |

OTHER PUBLICATIONS

Partial English Translation of Japanese Patent Publication No. 60-019191.

Primary Examiner—Gary V. Harkcom
Assistant Examiner—Randy W. Lacasse
Attorney, Agent, or Firm—Staas & Halsey

[57] ABSTRACT

A cathode ray tube (CRT) controller (6) reads out a predetermined picture from a frame memory (2) storing a picture to be processed, and generates a bit pattern with respect to a window memory (5), having a size corresponding to the frame memory (2) and storing a bit pattern which specifies the validity or invalidity of picture processing. The pattern output by the CRT controller (6) controls the processing of the frame memory (2), so that picture processing is executed solely with respect to picture data in an area of the frame memory (2) specified by the bit pattern.

4 Claims, 2 Drawing Sheets

PICTURE PROCESSING APPARATUS

CROSS-REFERENCE TO RELATED APPLICATION

This application is related to U.S. patent application Ser. No. 046,919, filed Apr. 3, 1987.

BACKGROUND OF THE INVENTION

1. Field of the Invention

This invention relates to a picture processing apparatus for processing picture data received from a sensor such as a video camera and displaying the processed data on a display unit. More particularly, the invention relates to a picture processing apparatus so adapted that picture processing can be limited by a window pattern generated by a graphic display processing controller.

2. Description of the Related Art

In a conventional picture processing apparatus, picture data from sensor of e.g. an industrial robot are stored in buffer memory such as a frame memory having a storage area corresponding to the display frame of the display unit, and discrimination of the position of an object contained in the picture data and recognition of the shape of the object are realized by executing predetermined picture processing with regard to all information in the frame memory.

With a conventional picture processing apparatus of this type, there are cases where the desired results can be obtained without performing processing with regard to all picture data in the frame memory. However, even if processing is executed by a dedicated picture processor for picture data stored in a frame memory, picture processing based on all information in the designated frame memory is unavoidable, thereby prolonging processing time. Accordingly, a system has been conceived in which window pattern information is outputted at the same time that the frame memory is designated by a main processor, a bit pattern designating an area necessary for feature recognition of a picture stored in the frame memory is formed in another frame memory in advance, and the area of picture processing is limited by the bit pattern. With this method, however, window data are generated and stored by the main processor, which therefore must be given a large memory capacity. In addition, processing time is prolonged, making it impossible to perform picture processing efficiently.

SUMMARY OF THE INVENTION

An object of the present invention is to provide a picture processing apparatus in which the memory capacity of the main processor can be reduced and picture processing time shortened so that highly efficient picture processing can be realized.

According to the present invention, there is provided a picture processing apparatus including a processor for performing picture processing, a frame memory for storing a picture to be processed by the processor, a window memory having a size corresponding to the frame memory for storing a bit pattern for designating the validity or invalidity of processing performed by the processor, a graphic display processing controller for generating a bit pattern with respect to the window memory, and a main processor for providing the graphic display processing controller with predetermined command data for bit pattern generation.

In the picture processing apparatus of the invention constructed as set forth above, the graphic processing controller generates a bit pattern with respect to the window memory, forms a bit pattern in accordance with what in the frame memory is to be processed, and performs picture processing solely with regard to picture data in the area of the frame memory specified by the bit pattern. As a result, the memory capacity of the main processor can be reduced and highly efficient picture processing can be carried out.

DESCRIPTION OF THE PREFERRED EMBODIMENT

An embodiment of the invention will now be described with reference to the drawings.

Figure 1:
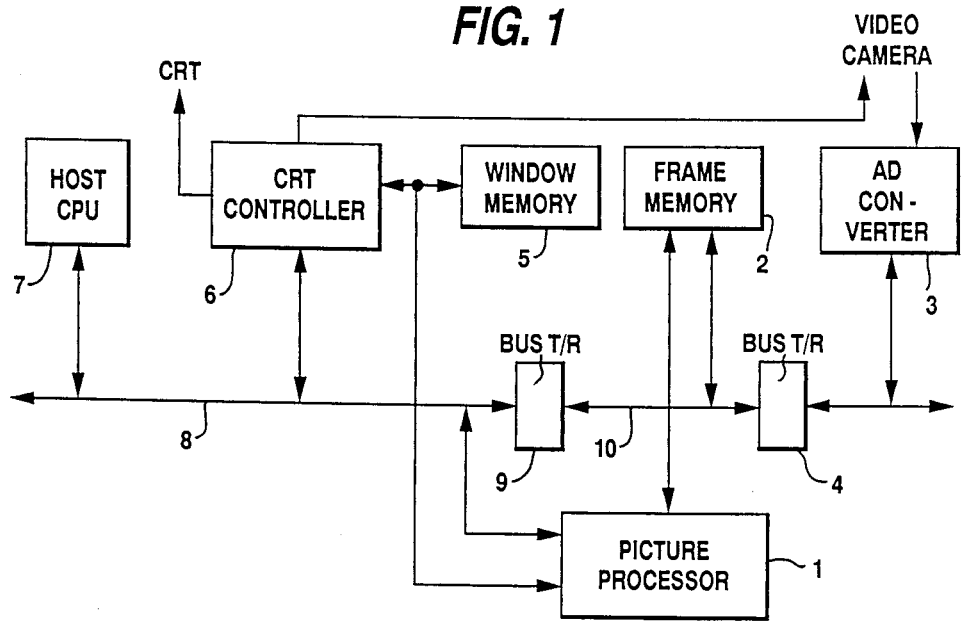
FIG. 1 is a block diagram illustrating a picture processing apparatus according to the present invention.
Figure 2:
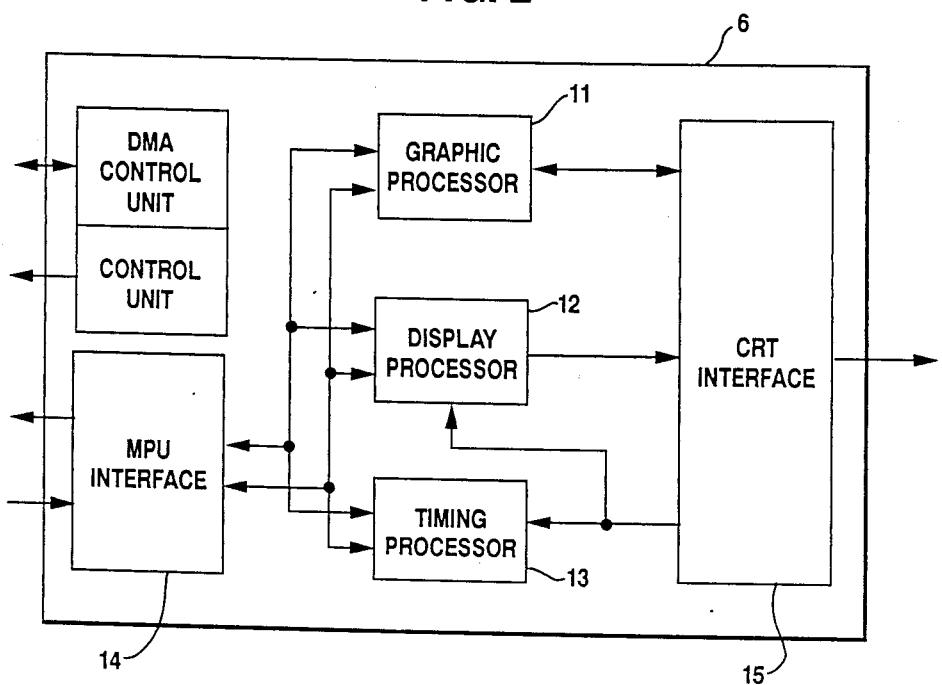
FIG. 2 is a block diagram of a CRT controller used in the apparatus illustrated in FIG. 1.

FIG. 1 is a block diagram of a picture processing apparatus according to the invention, and FIG. 2 is a schematic view for describing an example of the internal construction of a CRT controller.

In FIG. 1, numeral 1 denotes a processor for performing picture processing. The processor is connected to a frame memory 2, a plurality of which are provided, each for storing one frame of picture data two-dimensionally as plural horizontal and vertical pixel data. Numeral 3 denotes an AD converter for converting analog picture data from a video camera, which serves as a sensor, into a digital signal, and for writing the digital signal into the frame memory 2 via a bus transmitter/receiver 4.

Numeral 5 denotes a window memory, the size of which corresponds to the frame memory 2, storing a bit pattern for specifying the validity or invalidity of picture processing executed by the processor 1. The window memory 5 is connected to a CRT controller 6 having a graphic display processing control function, and to the processor 1.

The CRT controller 6 is a control circuit which functions to generate a synchronizing signal in order that picture data will be accepted from the video camera, store pictures in the frame memory 2, one frame at a time, and read a predetermined picture from the frame memory 2 to a display unit such as a CRT display, not shown. The CRT controller 6 is connected to a main bus 8 of a host CPU 7 and, upon receiving command data for bit pattern generation designated by the host CPU 7, functions to generate a bit pattern, which is then stored in the window memory 5, or to rewrite the bit pattern stored in the window memory 5.

Further, numeral 9 denotes a bus transmitter/receiver similar to the bus transmitter/receiver 4 and connected to a DMA bus 10, which is capable of performing high-speed transfer of pixel data between the frame memory 2 and the data bus 8.

As shown in FIG. 2, the CRT controller 6 comprises three processors controlled independently by a microprogram, namely a graphic processor 11, a display processor 12 and a timing processor 13, as well as an interface 14 for the host CPU 7, and an interface 15 for the CRT (not shown).

Figure 3:
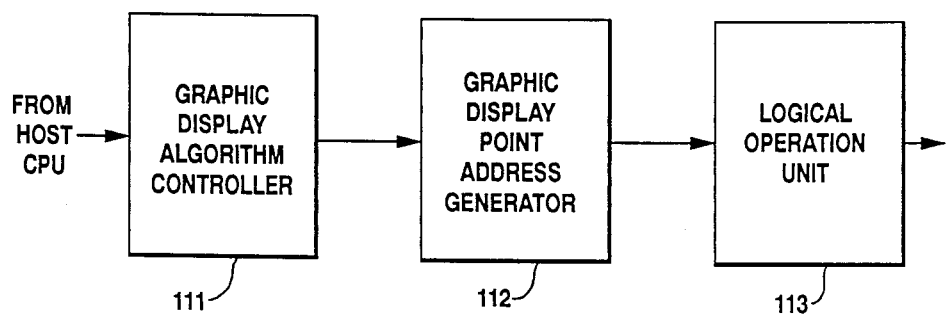
FIG. 3 is a block diagram illustrating the construction of a graphic processor.

FIG. 3 illustrates the construction of the graphic processor 11 having the graphic processing control function in the CRT controller 6.

The CRT controller 6 generally controls an exchange of data with the window memory 5 on the basis of a command/parameter received from the host CPU 7. This graphic processing operation is executed efficiently and at high speed by the following three processing controllers: a graphic algorithm controller 111 which analyzes command data from the host CPU 7 and calculates, in pixel units, an amount of change of a graphic display point in accordance with an algorithm microprogrammed with respect to the command data, a graphic display point address generator 112 for computing a buffer address, which corresponds to a pixel position to be graphically displayed, on the basis of the calculated amount of change of the pixel, and a logical operation unit 113 which performs an operation between buffer read data and graphic display data with respect to the graphic display point calculated by the graphic display point address generator, thereby writing the data in the buffer again.

Accordingly, if the CRT controller 6 having this graphic display processor 11 is used, the command data for bit pattern generation transferred from the host CPU 7 is interpreted and graphic display processing is performed at high speed with respect to the window memory 5. More specifically, graphic display point addresses are generated successively based on a graphic generating algorithm and a predetermined logical operation is performed on pixels designated by the picture data. The display processor 12 controls the display address of the frame memory 2 in dependence upon the frame format displayed on the CRT. The timing processor 13 generates a CRT synchronizing signal as well as various timing signals required within the CRT controller 6.

The interface 14 for the host CPU 7 has an asynchronous bus interface control function which renders the interface connectable to a general-purpose microprocessor, a control function for a DMA controller, and an interrupt control function. The interface 14 is capable of writing a bit pattern from the host CPU 7 into the window memory 5, and of reading out the bit pattern for the purpose of rewriting the same. The interface 15 on the CRT side is for inputting and outputting a synchronizing control signal and picture data signal with respect to the video camera and CRT display, and is capable of switching between a write address and a display address in dependence upon various operating modes.

When predetermined picture data in the frame memory 2 is accessed and picture processing for feature recognition of an object in a picture is carried out in the picture processing apparatus constructed as set forth above, a bit pattern specifying the validity or invalidity of processing performed by the picture processor 1 is formed in the window memory 5 in a size corresponding to the specified frame memory 2, so that the picture processing can be executed by the processor while it refers to the valid bits. In addition, a plurality of the window memories 5 can be provided and the window information limited by the bit pattern formed in the memories can be designated by the command data from the host CPU 7 in dependence upon the picture to be processed. Further, it is possible to modify or set a pattern with ease from the CRT controller whenever necessary while it is displayed on the display device.

Moreover, in the above-described embodiment, the CRT controller 6 for writing data into the frame memory 2 is used in synchronization with the video camera to execute graphic display processing with regard to the window memory 5. Accordingly, it is possible to subject picture data from the video camera to high-speed picture processing without providing a special graphic display processing control apparatus and without using the processing function of the CPU 7. At such time the CPU 7 need only output command data conforming to e.g. the shape, size, area, apices and lengths of sides of the object to be processed by the robot.

Though the present invention has been described based on the illustrated embodiment, the invention is not limited to the embodiment. For example, the CRT controller can be constructed in a variety of ways. Further, the setting of a window pattern may be predetermined in accordance with the features of the object to be processed in a picture. Thus, it goes without saying that various modifications can be made without departing from the scope of the invention.

Thus, as set forth above, the picture processing apparatus according to the present invention includes a processor for performing picture processing, a frame memory for storing a picture to be processed by the processor, a window memory having a size corresponding to the frame memory for storing a bit pattern for designating the validity or invalidity of processing performed by the processor, a graphic display processing controller for generating a bit pattern with respect to the window memory, and a main processor for providing the graphic display processing controller with command data for predetermined bit pattern generation. Accordingly, a window pattern, which was set in the frame memory in the prior art, can be generated in the window memory from the graphic display processing controller. As a result, the memory capacity of the main CPU can be reduced, and the validity or invalidity of processing is specified for every pixel of the frame memory. The end result is that highly efficient picture processing can be realized.

Thus, as set forth above, the picture processing apparatus according to the present invention forms a bit pattern in dependence upon the object of processing in the frame memory, and picture processing is performed only with regard to picture data in the specified frame memory area. This enables highly efficient picture processing to be realized. Accordingly, the invention is well suited for application to a picture processing apparatus for processing, and for displaying on a display unit, a picture imaged by a video camera indicative of the state of an operation performed by an industrial robot or the like.

What is claimed is:

1. A picture processing apparatus for processing picture data from a sensor and for displaying the processed data on a display unit, comprising:
   a picture processor for performing picture processing;
   a frame memory, operatively connected to said picture processor, for storing pixel data forming a picture to be processed by said picture processor;
   a window memory, operatively connected to said picture processor, having a size corresponding to said frame memory, for storing a designation bit pattern, each bit designating one of validity and invalidity of the processing performed by said picture processor on a corresponding pixel;

a graphic display processing controller, operatively connected to said picture processor and said window memory, for generating the designation bit pattern for storage in said window memory in response to command data; and a main processor, operatively connected to said graphic display processing controller, for providing said graphic processing controller with the command data for generation of the designation bit pattern.

2. A picture processing apparatus according to claim 1, further comprising additional window memories, each additional window memory storing an additional designation bit pattern, and wherein said graphic display processing controller selects one of the designation and additional designation bit patterns for picture processing in response to the command data.

3. A picture processing apparatus for processing picture data from a sensor and for displaying the processed data on a display unit, comprising:

a picture processor for performing picture processing;

a frame memory, operatively connected to said picture processor, for storing pixel data forming a picture to be processed by said picture processor;

a main processor for providing command data for bit pattern generation; and a graphic display processing controller, operatively connected to said picture processor, said window memory and said main processor, for generating the designation bit pattern for storage in said window memory in response to command data, said graphic display processing controller including a graphic display algorithm controller, operatively connected to said main processor, for analyzing the command data from said main processor and for calculating, in pixelunits, an amount of change of a graphic display point in accordance with an algorithm determined by the command data;

a graphic display point address generator, operatively connected to said graphic algorithm controller, for computing a buffer address, corresponding to a pixel position to be graphically displayed, in dependence upon the amount of change of the graphic display point calculated by said graphic display algorithm controller; and a logical operation unit operatively connected to said graphic display point address generator and the display unit, for performing an operation between buffer read data and graphic display data with respect to the graphic display point computed by said graphic display algorithm controller and said graphic display point address generator, to produce new buffer data.

4. A picture processing apparatus for processing picture data from an input unit to produce processed data to be displayed on a display unit, comprising:

a main processor for providing overall control of said picture processing apparatus including generating command data identifying a window in which picture processing is to be performed;

a frame memory, operatively connected to the input and display units, for storing pixel data forming a picture;

a graphic display processing controller, operatively connected to said main processor and the input and display units, for generating, under control of the command data, a designation bit pattern defining the window, each bit in the designation bit pattern having a corresponding pixel in the pixel data;

a window memory, operatively connected to said graphic display processing controller, having a size corresponding to the size of said frame memory, for storing the designation bit pattern; and a picture processor, operatively connected to said window memory, said frame memory and said main processor, for performing picture processing on the pixel data with validity of the processing for the corresponding pixel determined by the designation bit pattern.

* * * * *